(12) United States Patent
Heikamp

(10) Patent No.: US 8,123,831 B2
(45) Date of Patent: Feb. 28, 2012

(54) LIQUID SEPARATOR, PARTICULARLY OIL SEPARATOR FOR COMPRESSED AIR SYSTEMS

(75) Inventor: Wolfgang Heikamp, Waldsee (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/216,149

(22) Filed: Aug. 23, 2011

(65) Prior Publication Data

US 2011/0302890 A1    Dec. 15, 2011

Related U.S. Application Data

(63) Continuation-in-part of application No. 12/517,079, filed on Jun. 1, 2009, now Pat. No. 8,025,708, and a continuation of application No. PCT/EP2007/063442, filed on Dec. 6, 2007.

(30) Foreign Application Priority Data

Dec. 14, 2006 (DE) .......................... 20 2006 019 003

(51) Int. Cl.
*B01D 39/00* (2006.01)

(52) U.S. Cl. ................ 55/498; 55/486; 55/487; 55/524; 55/527; 55/528; 55/501; 55/502; 55/503; 55/510; 55/493; 55/495; 55/385.3; 55/423; 55/426; 55/428; 55/424; 55/DIG. 17; 96/198; 123/198 E; 210/232; 210/234

(58) Field of Classification Search ............... 55/498, 55/486, 487, 524, 527, 528, 501, 502, 503, 55/510, 493, 495, 385.3, 423, 426, 428, 424, 55/DIG. 17; 96/198; 123/198 E; 210/234, 210/232

See application file for complete search history.

(56) References Cited

U.S. PATENT DOCUMENTS

| | | | | |
|---|---|---|---|---|
| 2,544,244 A * | 3/1951 | Vokes | ............................ | 210/234 |
| 2,955,712 A * | 10/1960 | Gutkowski | .................... | 210/234 |
| 2,991,885 A * | 7/1961 | Gutkowski | .................... | 210/133 |
| 5,605,748 A * | 2/1997 | Kennedy et al. | ............... | 55/486 |
| 5,607,582 A * | 3/1997 | Yamazaki et al. | ............ | 210/234 |
| 5,800,584 A * | 9/1998 | Hinderer et al. | ................ | 55/482 |
| 6,962,615 B2 * | 11/2005 | Staudenmayer et al. | ....... | 55/486 |
| 7,195,122 B2 * | 3/2007 | Hiranaga et al. | .............. | 210/436 |
| 7,264,718 B2 * | 9/2007 | Knoll et al. | .................... | 210/232 |
| 7,837,876 B2 * | 11/2010 | Ye et al. | ........................ | 210/234 |

* cited by examiner

*Primary Examiner* — Jason M Greene
*Assistant Examiner* — Dung Bui
(74) *Attorney, Agent, or Firm* — James Hasselbeck

(57) ABSTRACT

The invention relates to a liquid separator, particularly an oil separator for compressed air systems. The liquid separator comprises a housing (15), which can be detachably connected by means of a bayonet-type connector (11) to a counterpart (12). The housing (15) is locked onto the counterpart (12) by axial tensioning forces (F) operable to lock the bayonet connector (11).

10 Claims, 3 Drawing Sheets

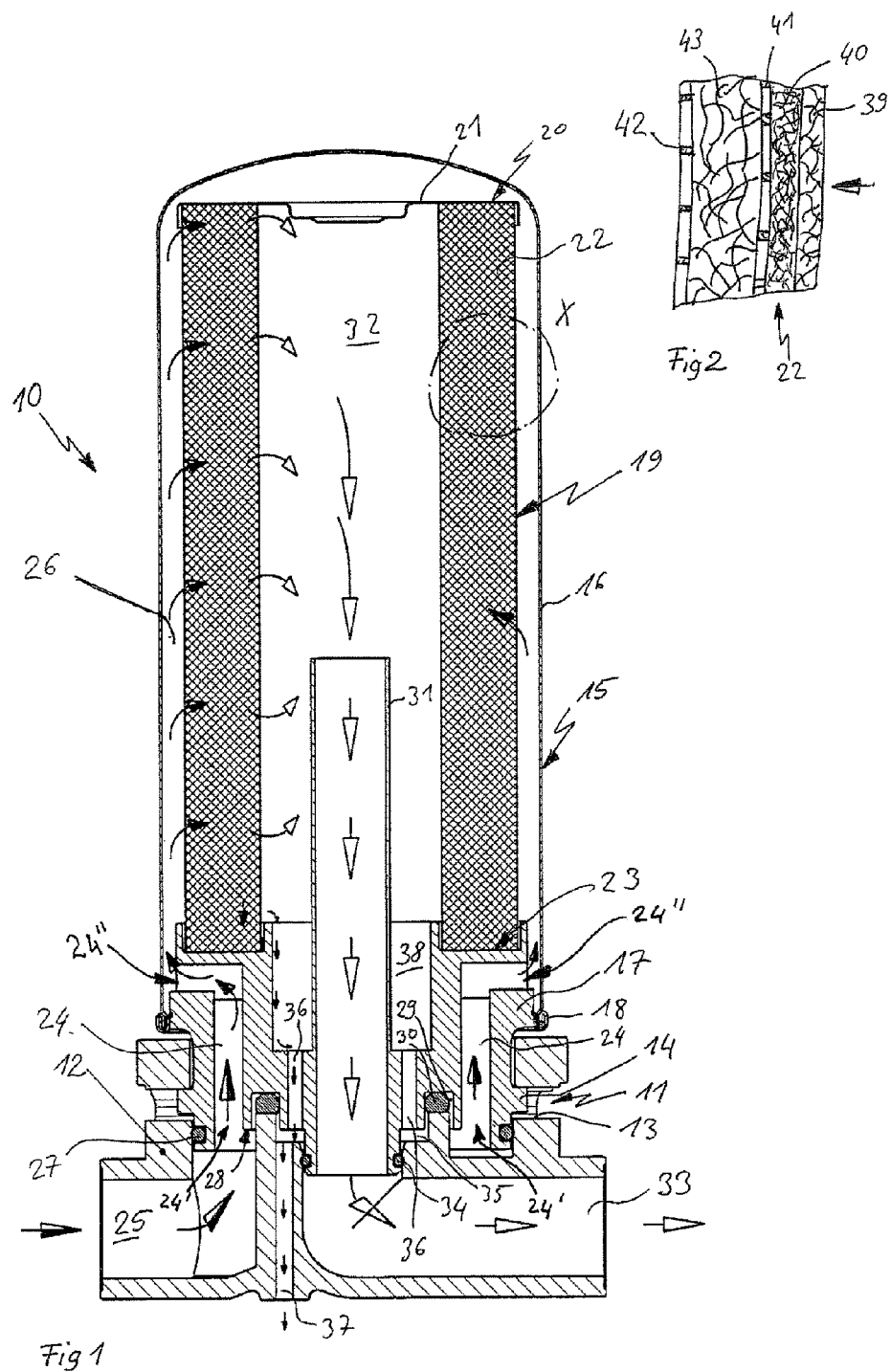

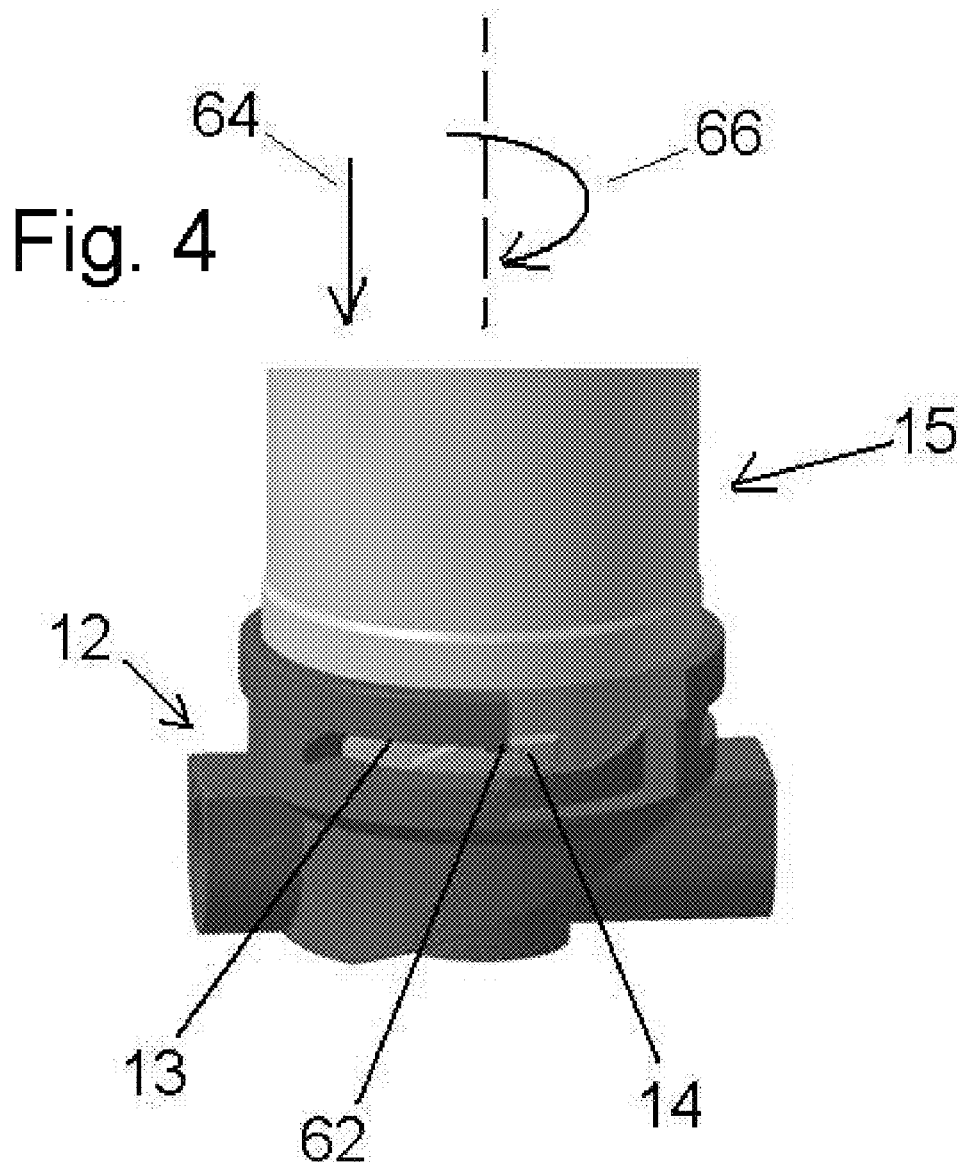

LIQUID SEPARATOR, PARTICULARLY OIL SEPARATOR FOR COMPRESSED AIR SYSTEMS

CROSS REFERENCE TO RELATED APPLICATIONS

The present application is a Continuation in Part of U.S. patent application Ser. No. 12/517,079 filed Jun. 1, 2009, which is hereby incorporated by reference in its entirety and to the fullest extent of the law. U.S. Ser. No. 12/517,079 is a US National Stage Entry of international patent application no. PCT/EP2007/063442, filed Dec. 6, 2007 designating the United States of America and which claims priority from Federal Republic of Germany patent application no. 20 2006 019 003.1, filed Dec. 14, 2006.

TECHNICAL FIELD

The invention relates to a liquid separator, in particular an oil separator for compressed air systems.

BACKGROUND OF THE INVENTION

Liquid separators are known which separate oil droplets from an air flow. For this purpose, the liquid separator has a separating medium that is arranged in a housing. The housing comprises a housing cup and a housing lid. The housing lid has a thread with which the liquid separator is screwed onto a head. In the head there is an air conduit for the air-oil mixture and a purified air conduit for the purified air. Moreover, the head has an oil discharge. The lid is provided with an unfiltered air inlet as well as a purified air outlet. The unfiltered air inlet communicates with the air-oil mixture conduit. The purified air outlet of the liquid separator is connected to the purified air passage of the head. The oil droplets contained in the air flow to be purified are agglomerated by the separator medium to larger drops that flow downward on the inner side of the circular closed separating medium. The separated oil can exit the liquid separator through an oil drain and is discharged by the oil discharge of the head. The liquid separator has a seal that is arranged between the lid of the liquid separator and the head. When mounting the liquid separator on the head, the housing is screwed onto the head in such a way that a seal-tight connection is produced. Depending on the force applied for screwing the liquid separator onto the head, the seal is compressed more or less. When the pressing force is too small leakage may occur. When the screw-on torque of the filter housing is too great, the seal may become damaged or the required release torque is too high so that an element exchange is made difficult. Moreover, the liquid separator must be rotated several times about its own axis until a fixed connection is generated.

It is an object of the present invention to provide a liquid separator that can be mounted in a simple way and is reliable with regard to handling.

SUMMARY OF THE INVENTION

The liquid separator according to the invention comprises a separating element and a housing. The housing comprises an inlet for the gas to be purified and an outlet for the purified gas. Moreover, the housing comprises a drain for the separated liquid. The separating element is integrated into the housing in such a way that the inlet is seal-tightly separated from the outlet. In this connection, the separating element has a separating medium that removes the liquid droplets contained in the gas flow from the gas flow. By means of the liquid separator any type of gas can be purified by removing liquid droplets contained therein. Preferably, air, in particular that of compressed air devices, can be purified. In this connection, contained water or oil droplets can be removed from the air flow.

The housing is connectable by a bayonet connection to the counterpart. The counterpart can be, for example, a connecting head which is connected to the compressed air devices. The bayonet connection is effected by a relative rotational movement of the liquid separator relative to the counterpart. For this purpose, on the liquid separator and on the counterpart several contours are arranged that will engage one another and have an incline relative to the filter axis. The incline extends about a defined circumferential angle and passes into an area that is parallel to the sealing area. Moreover, the matching contours can be designed such that within the rotational movement they can generate a locking action and can produce a stop for limiting the rotational movement. The locking action can be realized, for example, by a zigzag course of the matching contours. Alternatively, the locking action can also be produced by movable action elements which engage in a defined position a contour of the counterpart or of the liquid separator. Between the liquid separator and the counterpart preferably an elastomer seal is arranged that by means of the bayonet connection is clamped between two matching sealing surfaces. In this connection, the elastomer seal can be arranged axially as well as radially. In case of axial arrangement of the elastomer seal, the elastomer seal may be positioned to be compressed between the sealing surfaces of the counterpart and the housing so as to advantageously provide an axial tensioning force to the bayonet connection operable to hold the matching contours in a rotationally locking connection.

A spring tensioning member may be provided in the counterpart member or on the housing, such as on the lid. The spring tension member configured to be at least partially compressed between the lid and the counterpart when the bayonet connection is closed, providing an axial tensioning force to the bayonet connection operable to hold the matching contours of the bayonet in a rotationally locking connection.

The bayonet connection may be advantageously configured such that fluid or gas pressure present internally within the housing during operation provides an axial tensioning force to the bayonet connection to hold the matching contours in a rotationally locking connection.

The above axial tensioning forces may act alone or in an additive combination to provide a combined axial tensioning force to the bayonet connection to hold the matching contours in a rotationally locking connection. The axial tensioning force acts in a direction to separate the housing from the counterpart, this separation direction urging the bayonet connection into and against a rotation stop to prevent accidental rotation and opening of the bayonet connection.

According to an advantageous embodiment, the liquid separator housing is detachably and lockably connected by a bayonet connection to the counterpart. Preferably the bayonet connection is formed between the lid and the counterpart, The bayonet connection includes a bayonet connector receptor having an inner diameter and receiving geometries, preferably arranged as slots or grooves in the bayonet connector receptor. Preferably the receiving geometries are arranged on the counterpart, although they might alternately be arranged on the housing, preferably the lid. At least one radially extending contour is provided on the lid and is sized and configured to rotatably and releaseably engage into the receiving geometries of the bayonet connection. The contours and geometries operative to detachably mount the housing or the lid onto the counterpart. The bayonet connection is locked closed by an axial tension force acting between the housing/lid and the counterpart. The axial tensioning force urging the housing/lid and counterpart to axially move apart in a separating direction. However, the bayonet connection is configured such that the tensioning force urges the radially extending contours to lock into a rotational stop on the receiving geometries, preventing accidental rotation and opening of the bayonet connection.

Additionally axial tensioning force generated by the fluid or gas pressure within the housing can advantageously lock the bayonet in a closed position, preventing hand disassembly of the housing from the counterpart while the internal pressure in the housing is present and not balanced with the external pressure.

The means for producing the bayonet connection can be arranged in a special embodiment fixedly on the housing. As materials for the housing as well as for the means for forming the bayonet connection metals as well as plastic materials are suitable.

The liquid separator according to the invention can be connected without any auxiliary means with the counterpart wherein a defined clamping action is produced. The liquid separator is placed by the technician onto the counterpart and is screwed on by rotation about a defined rotational angle. The rotational angle is limited by a stop and/or a locking action of the bayonet connection. The rotary angle can be, for example, between 45 degrees and 360 degrees. Preferably, the rotational angle is between 60 degrees and 180 degrees. As a result of the predetermined incline of the bayonet contour the clamping action of the seal between the liquid filter and the flange housing is defined and ensured independent of the screw-on torque. This enables a simple and reliable mounting and removal of the liquid separator.

In case of a radial arrangement of the elastomer seal, seizing thereof on the surface is prevented and in this way an easy release of the liquid filter is ensured when demounting it.

According to an advantageous embodiment of the invention the bayonet connection is formed between the lid and the counterpart. In this connection, the required geometries are integrally formed on the lid. The geometries on the lid can be generated, for example, by stamping or shaping. The housing cup can be formed in this connection as an inexpensive deep-drawn part that can be produced in a simple way.

In additional configurations the lid can be provided with an inlet for the gas to be purified and/or the outlet for the purified gas and/or a drain for the separated liquid.

In case of integration of the openings into the lid the cup can be designed as a component that can be produced simply. The functional geometries required for the housing such as inlets and outlets or steps and projections are integrated into the lid so that only the lid must be matched to the respective attachment situation.

According to a special embodiment of the liquid separator according to the invention the drain for the separated liquid is arranged in an area of the lid that with regard to the direction of action of gravity is arranged at a bottom area. In this connection, the lid is connected to the cup in such a way that the lid in the mounted state is arranged at the bottom area In this way, the separated liquid can simply drain out of the liquid separator. In this connection it is advantageous when the drain for the separated liquid communicates with a discharge in the counterpart.

In a special embodiment the separating element is sealtightly connected to the lid so that leakage is prevented and the use of additional seals is not required. In this connection, the separating element can be glued or fused to the lid.

According to an advantageous embodiment, the separating element has a support body, a separating medium, and a drainage non-woven. In this connection, the support body is permeable for the gas to be purified. The separating medium and the drainage non-woven are arranged fixedly on the support body in such a way that undesirable deformations are prevented. Preferably, the separating medium and the drainage non-woven are formed as an areal knit fabric and wound about the support body in one for several layers. The liquid droplets contained in the gas flow are retained by the separating medium and agglomerated to form larger drops. The drainage non-woven that in the flow direction is arranged downstream of the separating medium serves for draining the liquid drops in the direction toward the drain. In this way, the separated drops can be removed simply and reliably from the gas flow and can be guided to the drain.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 1 depicts a liquid separator in a section side view with an elastomer tensioning force member, consistent with the present invention;

FIG. 2 depicts a details of the separating element of FIG. 1 in a section view;

FIG. 4 depicts a schematic example bayonet connection locked by tensioning forces, consistent with the present invention.

In the above Figures, like components are labeled with the same reference numbers across the Figures.

Figure 3:
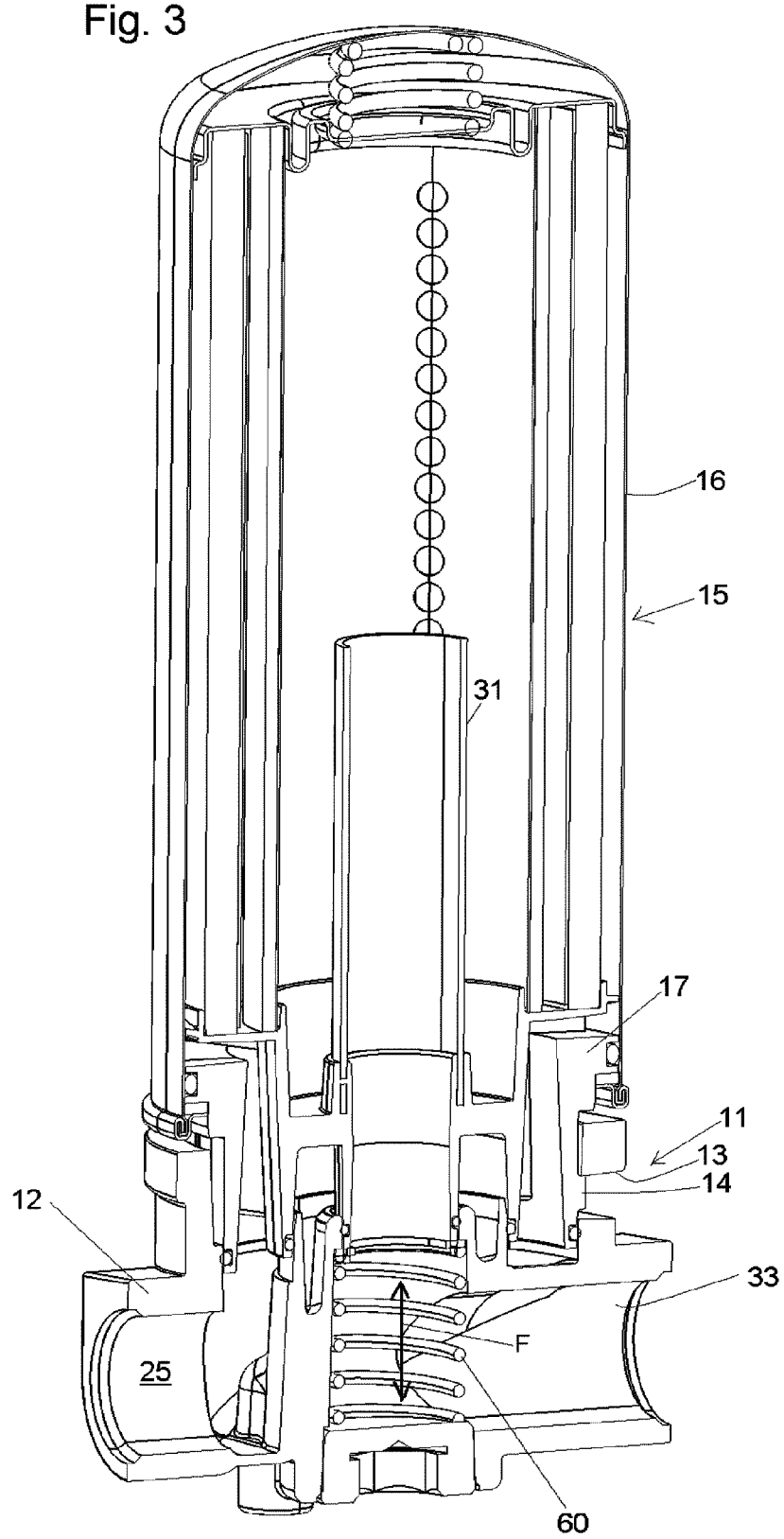
FIG. 3 depicts a liquid separator in section side view including a spring axial tension member, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a liquid separator, particularly and oil separator to separate oil from compressed gases. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In FIG. 1, a liquid separator 10 is illustrated in section. The liquid separator 10 is attached by means of bayonet connection 11 in an upright position to a head 12. In an alternative embodiment the liquid separator 10 can also be attached in a suspended position on the head 12 by means of the bayonet connection 11. The head 12 has receiving geometries 13 that are engaged by contours 14 of the liquid separator 10 for securing the liquid separator 10 on the head 12. In this connection, the contours 14 can be designed as cams. The geometries of the cams as well as their number and arrangement on the liquid separator 10 is adaptable to specific customer requirements inasmuch as the head 12 is designed appropriately. The liquid separator 10 comprises a housing 15 that is formed by a cup 16 and a lid 17. The cup 16 is connected by means of a crimped connection 18 to the lid 17. In this connection, between the lid 17 and the head 16 a seal can be arranged. This seal can be embodied as an insertion part. In another embodiment, the seal can also be foamed onto the lid 12 or can be dosed on. As an alternative to the crimped connection 18 the lid 17 of course can also be attached by other methods to the cup 16. For example, the connection can be generated by folding an edge or by welding. The contours 14 are arranged on the lid 17. In other embodiments, the contours 14 can also be provided on the lid 16 or on an additional component. Within the housing 15 a separating element 19 is arranged. The separating element 19 is substantially embodied as a hollow cylindrical component. In other embodiment, other geometric shapes, for example, oval or truncated cone-shaped geometries, can be realized also, of course. The separating element 19 is provided at an upper end face 20 with a terminal disk 21 that closes off the upper end face 20 seal-tightly. For this purpose, the terminal disk 21 is glued to a cylindrically closed separating medium 22. The separating medium 22 is glued with a lower end face 23 directly to the lid 17. In this way, the lower end face 23 does not require an additional terminal disk. In other embodiments, the connection of the separating medium 22 with the terminal disk 21 or the lid 17 can also be generated in a different way, in particular by welding. The separating medium 22 is formed by a single-layer or multi-layer fiber glass coil. In this connection, the fiber glass coil can be provided with an impregnation, in particular, with phenolic resin. A further configuration of the separating medium 22 will be explained in the following in more detail with the aid of FIG. 2.

The lid 17 has inlet openings 24 that connect a mixture passage 25 of the head 12 to a crude chamber 26. The openings 24 are distributed at the end face of the lid 17 on a pitch circle wherein the inlet cross-sections 24' at the end face pass into outlet cross-sections 24" distributed on the periphery. For sealing the mixture passage 25 relative to the surroundings, the lid 17 comprises an O-ring seal 27 that matches an inner diameter of the head 12. In order to achieve a uniform flow into all inlet openings 24, the lid 17 has an axially displaced annular end face 28. In the area of the annular end face 28 a receiving groove 29 is arranged in which an O-ring 30 is seal-tightly compressed between the lid 17 and the head 12. The compressed O-ring 30 advantageously generates an axial tensioning force F (see FIG. 3), urging the lid 17 and head 12 to separate in a axial separation direction. This axial tensioning force may be used to lock the bayonet connection. The lid 17 has a centrally arranged clean pipe 31 that connects the clean chamber 32 arranged in the interior of the separating element 19 to the purified gas outlet 33. For a seal-tight connection of the clean pipe 31 to the purified gas outlet 33 an O-ring 34 is provided that is compressed between the head 12 and the lid 17. The end face of the clean pipe 31 in the axial direction projects past the annular end face 28 so that between the O-rings 30, 34 a liquid chamber 35 is formed. The liquid chamber 35 is connected by means of an outlet opening 36 to the interior of the separate element 19. For uniform discharge of the separated liquid several outlet openings 36 are uniformly distributed on a pitch circle. Since the outlet openings 36 are integrated directly into the lid 17, additional seals are not required because no sealing locations that must be sealed are present. The outlet openings 36 communicate by means of the liquid chamber 35 with the drain 37 arranged in the head 12. In order to be able to remove easily the liquid droplets that have been separated by means of the separating element 19 from the housing 15, the lid 17 has an annular receiving chamber 38 into which the outlet openings 36 open. The clean pipe 31 penetrates the receiving chamber 38 wherein the opening of the clean pipe is spaced axially relative to the receiving chamber 38. By means of this axial spacing it is achieved that no separated liquid droplets reach the clean pipe.

The liquid-gas mixture to be cleaned, in particular an air-oil mixture, flows through the mixture passage 25 into the inlet openings 24 of the liquid separator 10. The mixture to be cleaned flows from the crude chamber 26 through the separating element 19 wherein the separating medium 22 retains the contained liquid droplets. The purified gas enters the clean chamber 32 and passes in the flow direction through the clean pipe 31 to the purified gas outlet 33 wherein it leaves the head 12. In the illustrated embodiment, the flow passes through the separating element 19 from the exterior to the interior. In other embodiments, the separating element 19 can also be flown through from the interior to the exterior. In this case, the inlet and outlet 24, 31 as well as the crude and clean chambers 26, 32 are interchanged. The separated liquid droplets are guided into the bottom area of the separating medium from where they pass into the receiving chamber 38. The collected liquid droplets are guided through the outlet opening 36 into the drain 37. The liquid can subsequently be supplied again to another consumption process or can be disposed of.

In FIG. 2 the detail X of the separating medium 22 according to FIG. 1 is illustrated. The separating medium 22 has a coarse fiber glass coil 39 that is positioned in the flow direction on the exterior and a finer fiber glass coil 40 that is impregnated with phenolic resin. The fiber glass coils 39, 40 are mechanically stabilized by a support pipe 41. Between support pipe 41 and an inner pipe 42 a drainage non-woven 43 is arranged which is comprised of polyester, for example. In the drainage non-woven 43 the liquid droplets are collected and guided downwardly in the direction of the force of gravity. As an alternative to the described configuration several fiber glass coil layers or drainage non-woven layers can be arranged.

FIG. 3 depicts a liquid separator in section side view including a spring axial tension member 60. Axial tensioning force F may be produced by the action of internal fluid pressure within the housing 15 and/or by the forces generated by compression of the spring element 60 when mounting the housing 15 onto the head or counterpart member 12. The axial tensioning force F acts to urge the housing 15 to move apart from the head or counterpart member 12. As can be seen in FIG. 3, the spring may replace the axially compressible elastomer O-ring (30 in FIG. 1) for provision of the axial tensioning force F, discussed earlier.

FIG. 4 depicts a schematic example bayonet connection locked by axial tensioning forces, provided for a clearer understanding. The housing 15 may be installed onto the head or counterpart member 12 in a mounting direction 64 in which the radially extending contours 14 of the housing 15 are axially inserted into a receiving position of the receiving contours 13 of the bayonet connector receptor on the head 12. After insertion, the bayonet connection may be closed by rotation about the illustrated axis in a closing direction 66. The closing direction is illustrated as clockwise, although it is to be understood that the closing direction may alternately be in the counter-clockwise direction depending upon configuration of the bayonet connection. In FIG. 4, the radially extending contours 14 are illustrated in a position between the open and closed positions. When rotated fully to the closed position the radially extending contours 14 are held against an upper portion of the track formed by the receiving contours 13 by the axial tensioning forces discussed earlier. An axially extending rotational stop 64 in the receiving contours 13 engages against the radially extending contours 14 of the housing 15, preventing the housing 15 from rotationally dismounting from the counterpart member 12.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A liquid separator for separating oil in compressed air systems, comprising:
   a separating element and a housing, wherein said housing comprises a lid and a cup,
   wherein said separating element is arranged seal-tightly within said housing and said housing is detachably connectable to a counterpart,
   wherein the housing is detachably and lockably connectable by a bayonet connection to said counterpart,
   wherein said bayonet connection is formed between said lid and said counterpart,
   wherein said bayonet connection is locked closed by an axial tension force acting between said lid and said counterpart, said axial tensioning force urging said lid and counterpart to axially separate,
   wherein said tension force urges said radially extending contours to lock into a rotational stop on said receiving geometries, said rotational stop preventing accidental rotation and opening of said bayonet connection,
   wherein said lid has an inlet for gas to be purified, an outlet for purified gas, and a liquid outlet for separated liquid,
   wherein said liquid outlet is arranged in a bottom area of the lid with respect to a direction of gravity, said liquid outlet communicating with a drain that is arranged in said counterpart,
   wherein said separating element is seal-tightly connected to said lid,
   wherein gas pressure within said housing provides at least a portion of said axial tension force.

2. The liquid separator according to claim 1, wherein said bayonet connection comprises:
   a bayonet connector receptor having an inner diameter and receiving geometries, said bayonet connector arranged on said counterpart;
   at least one radially extending contour provided on said lid said at least one contour sized and configured to rotatably and releaseably engage into said receiving geometries of said bayonet connection, said contours and geometries operative to detachably mount said lid onto said counterpart,
   wherein said tension force urges said radially extending contours to lock into a rotational stop on said receiving geometries, said rotational stop preventing accidental rotation and opening of said bayonet connection.

3. The liquid separator according to claim 1, wherein said separating element comprises a support body, a separating medium element and a drainage non-woven, and
   wherein said separating medium and said drainage non-woven are connected to said support body.

4. The liquid separator according to claim 2, wherein
   at least a portion of said axial acting tension force locking said bayonet is generated by an elastomer O-ring arranged and compressed between said counterpart and said lid.

5. The liquid separator according to claim 2, further comprising
   a tensioning spring arranged within said counterpart and at least partially compressed between said counterpart and said lid, said tensioning spring providing at least a portion of said axial tensioning force locking said bayonet.

6. The liquid separator according to claim 1, wherein said lid is connected by a crimped connection to said cup.

7. A liquid separator system for separating liquid from compressed air, comprising:
   a head member defining a mixture passage, a purified gas outlet and a drain opening, said head member comprising:
      a bayonet connection receptor having an inner diameter and receiving geometries;
   a liquid separator comprising:
      a cup member having a cup chamber and an open end;
      a lid member sealably closing over said open end of said cup member, said lid member secured to said cup member by a crimped connection, said lid member defining passages including:
         an inlet opening in communication with said mixture passage;
         at least one outlet opening in communication with said drain opening; and a clean pipe in communication with said purified gas outlet;

a separating element received into said cup chamber, said separating element adhesively secured at a first end to said lid, a second end of said separating element closed over by a terminal disk, said lid, terminal disk and separating element defining a clean chamber within, said lid member further comprising:

a receiving chamber in the form of an annular depression for receiving liquid droplets separated from compressed air, wherein said receiving chamber is in communication with said outlet opening of said lid; and a bayonet connection sized and configured to be received into said inner diameter of said bayonet connection receptor, said bayonet connection including an O-ring seal configured to provide a sealed connection between said bayonet connector and said bayonet connection receptor; and at least one radially extending contour sized and configured to releaseably and lockably engage with said receiving geometries of said bayonet connection, said contours and geometries operative to detachably mount said lid member onto said head member;

wherein said clean pipe extends through said receiving chamber and into said clean chamber, said clean pipe configured to isolate said liquid in said receiving chamber from said purified gas outlet; and wherein head member and said lid member together define a liquid chamber therebetween, said liquid chamber interposed between said outlet opening of said lid and said drain opening of said head member, said liquid chamber guiding separated liquid droplets from said outlet openings of said lid member and said drain opening of said head member, wherein said bayonet connection is locked closed by an axial tension force acting between said lid and said head member, said axial tensioning force urging said lid and head member to axially separate, wherein said tension force urges said radially extending contours to lock into a rotational stop on said receiving geometries of said bayonet connection receptor, said rotational stop preventing accidental rotation and opening of said bayonet connection, wherein gas pressure within said housing provides at least a portion of said axial tension force.

8. The liquid separator according to claim 7, wherein
at least a portion of said axial acting tension force locking said bayonet is generated by an elastomer O-ring arranged and compressed between said head member and said lid.

9. The liquid separator according to claim 7, further comprising
a tensioning spring arranged within said head member and at least partially compressed between said head member and said lid, said tensioning spring providing at least a portion of said axial tensioning force locking said bayonet.

10. The liquid separator system of claim 7, wherein said separating element further comprises:
an inner pipe having a plurality of passages therethrough;
a support pipe having a plurality of passages therethrough and radially spaced inwards from said inner pipe;
a drainage non-woven disposed between said inner pipe and said support pipe; and
a fiberglass coil disposed at an interior of said support pipe and mechanically stabilized by said support pipe;
wherein said fiberglass coil is impregnated with a phenolic resin.

\* \* \* \* \*